United States Patent [19]
Baum, Sr. et al.

[11] 4,177,009
[45] Dec. 4, 1979

[54] ROTOR ASSEMBLY

[76] Inventors: Joseph W. Baum, Sr., Rte. #1, Box 250, Scottsdale, Ariz. 85257; Dave A. Timothy, 2340 E. University Dr., Tempe, Ariz. 85281

[21] Appl. No.: 893,800

[22] Filed: Apr. 5, 1978

Related U.S. Application Data

[63] Continuation of Ser. No. 749,771, Dec. 13, 1976, abandoned.

[51] Int. Cl.² .................. F03D 3/02; F03D 7/06
[52] U.S. Cl. .................. 416/45; 416/53; 416/197 A
[58] Field of Search .......... 416/197 A, DIG. 4, 117, 416/119, 45, 53

[56] References Cited
U.S. PATENT DOCUMENTS

| 752,764 | 2/1904 | Dunne | 416/197 A |
|---|---|---|---|
| 1,200,308 | 10/1916 | Bunnell | 416/197 A X |
| 1,766,765 | 6/1930 | Savonius | 416/132 B |
| 2,067,542 | 1/1937 | Penton | 416/197 A X |
| 3,093,194 | 6/1963 | Rusconi | 416/197 A |
| 4,005,947 | 2/1977 | Norton et al. | 416/197 A |

FOREIGN PATENT DOCUMENTS

| 727519 | 6/1932 | France | 416/197 |
| 797106 | 4/1936 | France | 416/197 A |

*Primary Examiner*—Everette A. Powell, Jr.
*Attorney, Agent, or Firm*—LaValle D. Ptak

[57] ABSTRACT

A wind rotor assembly is constructed as a variation of a Savonious rotor with two offset compound curve rotor plate members symetrically located about an axis and including a smaller S-shaped rotor at the axis in the space between the first and second rotor members. The assembly is used singly or in composite assemblies of several rotors on a common shaft, and it produces increased torque and operates at low wind velocity for use in the generation of electricity or in conjunction with a water pump or other applications.

12 Claims, 7 Drawing Figures

ROTOR ASSEMBLY

This is a continuation of application Ser. No. 749,771, filed Dec. 13, 1976, now abandoned.

BACKGROUND OF THE INVENTION

With ever increasing world population and greater industrialization of both the developed and undeveloped countries of the world, higher and higher demands for energy are being created. At the present time, these energy demands primarily are being met through the increased consumption of fossil fuels such as coal and petroleum. The world's supply of these and other expendable fuels, such as those used to produce atomic energy, is finite and non-replenishable. As a consequence, increased attention is being directed to alternative ways of producing energy on both large-scale and small-scale or individualized bases.

Substantial attention is being devoted to the development of solar energy and to the harnessing of the energy of the tides and winds. These sources of energy essentially are non-exhaustable. For this reason, as the available supplies of fossilized fuels are disappearing at an alarming rate, it finally is becoming clearly apparent that energy generation from sources which do not rely upon the consumption of finite resources must be developed in the relatively near future.

Wind plants, such as the familiar windmills used for many years in rural areas of the United States to pump water, and wind chargers for charging battery packs to supply electricity have generally fallen into disuse. Relatively little has been done to develop new forms of windmill blades or wind rotors for more efficiently harnessing the power available in the winds.

The common windmills and wind chargers use propeller or blade-driven rotors which rotate a horizontal shaft mounted high on a tower. If the wind charger is used to generate electricity, it is necessary also to mount the charger high on the tower to place it adjacent to the horizontal rotating shaft. The alternative is to provide some type of complex, cumbersome and energy wasteful linkage from the top of the tower to a location near the bottom. Such an alternative is impractical.

Another type of wind rotor used to rotate a vertical shaft has been known for many years. This type of rotor is essentially an S-shape vertical rotor known as a Savonious rotor. A Savonious rotor typically is built by splitting a cylinder equally through its length and offsetting the halves by a distance equal to or less than the radius of the cylinder. This assembly then is attached to a shaft through its center and rotates when it is exposed to the wind. Savonious rotors have not enjoyed much use, primarily due to the fact that they were introduced after the more common already perfected multi-blade farm windmill and the high-speed propeller-driven generators were in widespread use. Also, wind tunnel tests seemed to prove that conventional multi-blade farm windmills or propeller-driven generators were more efficient than the Savonious S-rotors.

Under normal outdoor operating conditions, however, a Savonious type rotor is superior in operation to the conventional blade type windmills. This is because of the characteristics of natural outdoor winds which differ significantly from wind tunnel operation. Two basic types of wind exist. First is the "prevalent" wind which is the prevailing wind in any given area and exists on most days. This wind also is, at any given time, a relatively steady wind both in magnitude and direction. The second type of wind is known as "energy" wind. Energy winds blow for much less time than prevalent winds but provide the highest percentage of power available for moving air masses over a measured period of time in any given locality.

Generally, energy winds exist in the form of gusts of wind which occur simultaneously with a prevalent wind. These gusts of energy winds, however, usually deviate in direction from the prevalent wind over a wide range, as much as 15 to 70 degrees. What this means to the efficient operation of any wind driven rotor or windmill readily becomes apparent when a conventional blade type rotor or propeller-driven unit is placed next to a Savonious-type rotor. During the times of operation in a steady wind, the wind tunnel results exhibiting superiority of the blade-type unit appear to exist. As soon as a gust occurs, however, the propeller or blade-driven unit swings into it under control of the vane which is provided for this purpose. Then as the gust of energy wind dies away, the vane of the blade-type windmill slowly moves the blade back into the prevalent wind. The Savonious S-rotor, in contrast, merely speeds up when a gust of wind occurs and slows down as the wind velocity drops back to the prevalent wind velocity. Analysis of this operation shows that the S-rotor is capable of handling wind sequentially or simultaneously from any direction and does not require any time to align itself first with the prevalent wind, then with a gust and back again, as contrasted with conventional blade windmill designs. This means an S-rotor can obtain the advantages of a significant percentage of the total available force of the winds, particularly from the power available in the gusts.

In addition to the ability of an S-rotor blade to absorb wind forces from all directions at all times, the same characteristics which permit this to occur also inherently provide improved durability of S-rotors over spinning propeller or fan-type windmills. A spinning blade, as is well known, exhibits a gyroscopic effect; so that its constant adjustment to the direction of wind gusts and the like under the control of the vane on the windmill subjects the windmill unit to substantial stresses, particularly at high wind speeds. No comparable stresses are incurred in the operation of an S-type rotor. In addition, an S-type rotor turns more slowly in a given wind; but because the S-rotor presents a much larger surface area to a moving air mass for a unit of a given diameter, it is capable of developing the same power as a faster rotating fan or propeller mill in spite of its lower rotational speeds.

Even with all of the advantages of Savonious S-rotors for producing energy from wind, there still are disadvantages in obtaining energy from relatively low prevalent winds, that is winds of the order of 5 to 7 miles per hour. In many areas of the country, however, the average or prevalent wind speed is this low, that is, 5 to 7 miles per hour. Therefore, it is desirable to provide an improved rotor which is capable of operation at low wind speeds with maximum efficiency and having the advantages of a Savonious S-type rotor design.

SUMMARY OF THE INVENTION

It is an object of this invention to provide an improved fluid-driven rotor.

It is an additional object of this invention to provide an improved wind-driven rotor.

It is another object of this invention to provide an improved S-type rotor assembly.

It is a further object of this invention to provide an improved wind rotor assembly which may be used singly or in groups to rotate a vertical shaft and which is capable of operation over a wide range of wind velocities.

It is yet another object of this invention to provide an improved wind rotor for rotating a vertical shaft.

In accordance with a preferred embodiment of this invention, a rotor blade assembly is attached to a vertically rotatable shaft. The rotor blade is comprised of first and second diametrically opposed curved side rotor plate members, each of which is formed as a section of a cylinder having a radius R1. These two rotor plate members are concentrically located on diametrically opposite sides of the axis of the shaft with the convex sides facing the shaft. Third and fourth rotor plate members, each of which also are formed as sections of a cylinder, are attached to a diametrically opposite first edges of the first and second rotor plate members and curve toward the shaft and terminate in respective edges parallel to the shaft equidistant from a plane defined by the diametrically opposite second edges of the first and second rotor plate members. End plate members are attached to the rotor plate members and are located in spaced parallel planes which are perpendicular to the axis of the shaft to form end walls for the rotor assembly.

More specific embodiments include an additional S-blade rotor located in the space between the axis of the shaft and the terminating edges of the third and fourth rotor plate members. In still a more specific embodiment of the invention, centrifugally operated spoiler doors are provided on the first and second rotor plate members for spilling air out of the rotor at some predetermined rotational speed of the rotor.

DETAILED DESCRIPTION

Figure 1:
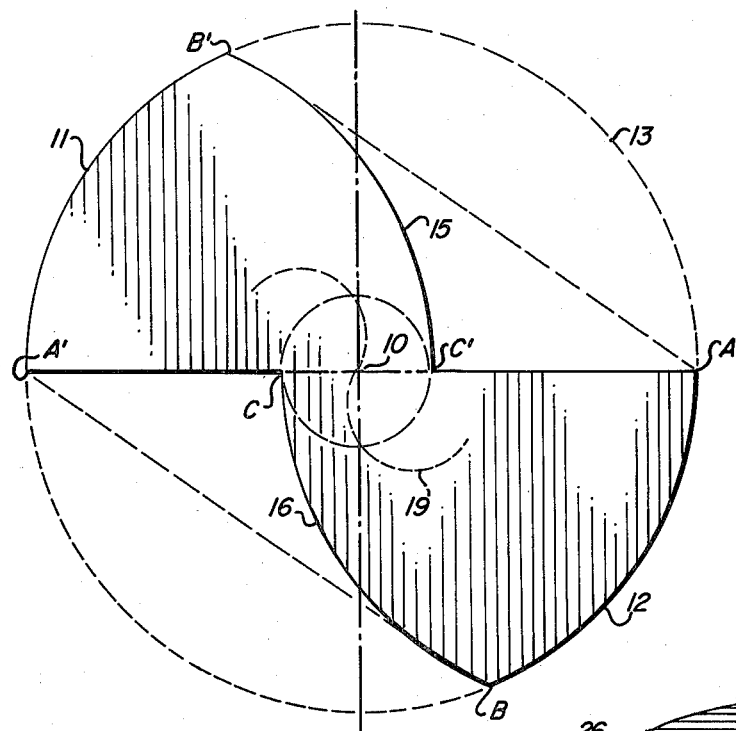
FIG. 1 is a top view of a preferred embodiment of the invention.

Referring now to the drawing, the same reference numbers are used throughout the different figures to designate the same or similar components. FIG. 1 is a top view of a rotor blade assembly made in accordance with a preferred embodiment of the invention. The rotor blade assembly is arranged symetrically about a shaft 10 which may be attached to the outside of the assembly or pass directly through it. Typically the shaft 10 is vertically arranged so that the entire rotor assembly may be mounted relatively close to the ground as compared with conventional windmills.

The rotor blade assembly includes a pair of curved side rotor plate members 11 and 12, each of which are formed as a section of a cylinder which has a radius R1. This radius in FIG. 1 is the distance from the shaft 10 to the point A, designating one edge of the side rotor plate member 12, or the point A', designating the corresponding diametrically opposed edge of the rotor plate member 11. As can be seen from FIG. 1, the rotor plate members 11 and 12 are concentrically arranged about the axis of the shaft 10, the dotted lines 13 in FIG. 1 indicating the completed circular cross-section of the cylinder of which the members 11 and 12 are formed.

Figure 2:
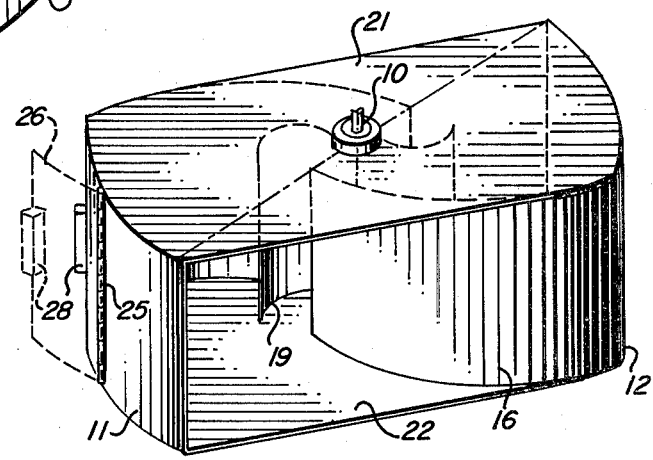
FIG. 2 is a perspective view of a preferred embodiment of the invention.

At point B' for the rotor member 11 and at point B for the rotor member 12, the assembly is completed by third and fourth rotor plate members 15 and 16, respectively, which also are formed as sections of a cylinder. These sections are the same vertical height as the plate members 11 and 12 (as is seen most clearly in FIG. 2) and curve inwardly toward the shaft 10. As shown in FIGS. 1 and 2, the inner edges of the plate members 15 and 16 terminate on a plane defined by the diametrically opposite edges A' and A of the side rotor plate members 11 and 12. These termination points, however, can be varied to cause the edges of the plate members 15 and 16 to terminate beyond the points C and C' located in FIG. 1 or short of these points but equidistant from the plane passing through the edges A and A' of the outside rotor plate members 11 and 12 of the assembly.

The termination points of the inner edges of the plates 15 and 16 are equidistant from the axis of the shaft 10 and lie on a circle (the inner circle indicated in dotted lines in FIG. 1) which has a radius R2, where the radius R2 is less than the radius R1 of the cylinder from which the outside rotor plate members 11 and 12 are formed. Typically the inner ends of the plates 15 and 16 are located at a distance which is equal to one-half of the radius R1 or less. In rotor assemblies which have been constructed, it appears that the radius R2 which defines this inner termination point of the plates 15 and 16 provides the optimum operating characteristics of the rotor when it is one-fourth R1, that is when R1 equals 4R2.

Also, in actual constructions of the rotor assembly which have been operated, the plates 15 and 16 have been formed of sections of a cylinder which has a radius equal to R1, the same radius as the cylinder from which the plates 11 and 12 are formed. This relationship appears to provide an ideal optimum operating condition, and the discontinuity in the compound curve of the composite rotor blade which exists at points B and B' is believed to concentrate the maximum point of torque created by wind blowing into the rotor farther out from the axis of the shaft 10 than with conventional Savonious S-rotor blades. At the same time, the convex curvature provided by the plates 15 and 16 causes the air passing into the rotor to be discharged from the open inner ends of these plates on to the opposite one of the plates 15 or 16 as the rotor is driven by the wind. This increases the amount of torque which is available from the rotor assembly over that which is attainable from a conventional S-rotor configuration.

It also has been found that if a smaller S-rotor blade assembly 19 is mounted in the opening between the inner edges of the rotor plates 15 and 16, as shown in FIGS. 1 and 2, an even greater operating torque is attainable from the rotor assembly. The addition of the rotor blade 19 also permits operation of the assembly at lower wind velocities, and successful operation has been effected in wind velocities as low as 5 miles per hour with this composite assembly.

In a typical construction, the radius of curvature of the two halves of the S-shaped rotor blade 19 is approximately the same as the radius of the inner circle used to define the termination distance of the inner edges of the plates 15 and 16 from the axis of the shaft 10. In an experimental structure, the radius (R2) of this inner circle was 2¼ inches, the radius of curvature of each half of the rotor blade 19 was 2½ inches, while the radius (R1) of the cylinder from which the rotor sections 11 and 12 was formed was 9 inches. In addition, the distance between the points A and B and also between points A' and B' was 9 inches; and the radius of the cylinder from which the plates 15 and 16 was formed was the same as that used for the plates 11 and 12. Maintaining these proportions on larger or smaller rotors appears to provide ideal operating characteristics for optimum efficiency, but variations of these ratios or proportional dimensions clearly are within the scope of the invention.

The addition of the smaller S-shaped inner rotor 19 in the assembly substantially improves its operation over rotor assemblies which are otherwise the same but without the inner rotor blade 19.

The assembly is completed by enclosing the upper and lower surfaces with end plates 21 and 22, respectively. These end plates preferably have a quasi-rectangular circumference configuration, as shown in FIG. 2 and shown in dotted lines in FIG. 1, since this configuration appears to trap the maximum amount of air from the wind to optimize operation of the rotor. The end plates 21 and 22, however, could be made merely to overlie the longitudinal projections of the outlines of the rotor blade sections 11, 12, 15 and 16 as shown in the shaded portion of FIG. 1. By extending them to the configuration of FIG. 2, however, improved operation of the rotor, both at low and high wind speeds, has been attained.

Figure 4:
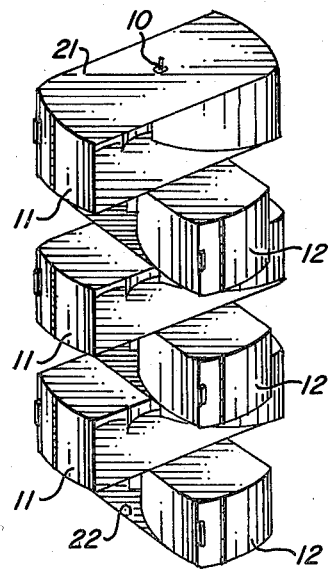
FIG. 4 illustrates the manner in which several rotors of the type shown in FIG. 2 can be mounted together on a common shaft.

Whatever size is chosen for the rotor assembly, it is apparent that a given rotor is able to provide only a predetermined amount of torque in response to the wind to which the rotor is subjected. If greater amounts of torque are desired, without increasing the size of the rotor assembly itself, several rotor assemblies may be fixed to a common shaft 10 and disposed about the shaft by different angular amounts to increase the available torque from the composite assembly. Such an arrangement is shown in FIG. 4 where six rotor assemblies of the type shown in FIG. 2 are placed about a common vertical shaft 10. In FIG. 4, each of the rotor assemblies are shown offset from the next adjacent one on the shaft by 90 degrees. Other variations could be employed, however, such as offsetting each of the adjacent rotor assemblies by 30 degrees or 60 degrees from one another around the shaft. The particular arrangement which is chosen may be varied to suit the operating conditions to which the assembly is subjected. It appears by offsetting each successive assembly by less than 90 degrees about the shaft 10, a smoother operation in response to both prevailing winds and wind gusts should result.

Figure 3:
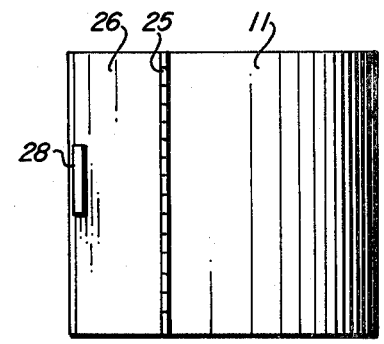
FIG. 3 shows details of a portion of the embodiment of FIG. 2.

Although much of the foregoing discussion has been directed to the features of the rotor assembly which cause it to be suitable for operation at low wind speeds, the assembly also is capable of operation at high wind speeds. However, as with any wind rotor assembly, it is desirable to provide some means for limiting or slowing down the rotational speed of the rotor when winds of excessive force are encountered. This is accomplished with the rotor assembly shown in FIGS. 2 and 3 by forming the section 26 of the members 11 and 12 which is adjacent the points B' and B as a separate section hinged to the main or forward section of these members by a spring-biased hinge 25, which normally maintains the rotor configuration of the members 11 and 12 as shown in FIG. 1. Spring-biased hinges of this type are commonly used for a number of different purposes, and the strength of the spring determines the amount of force which is required to open the spoiler door section 26 from the solid line position shown in FIG. 2 to the dotted line position.

As a further means of controlling the centrifugal force which is needed to open the section 26, a weight 28 may be attached to the edge of the section 26 located nearest the points B' and B of the members 11 and 12. This is shown most clearly in FIGS. 2 and 3. When winds of less than the amount creating a centrifugal force sufficient to open the sections 26 are encountered, the rotor assembly provides its maximum response to the winds to which it is subjected. When the assembly, however, rotates at some rotational speed which is in excess of what is predetermined to be a reasonable upper limit, the additional centrifugal force causes the weight 28 on the section 26 to open the section 26 against the action of the spring-biased hinge 25 by varying amounts as indicated in dotted lines in FIG. 2. When this occurs, air is spilled out of the rotor at the point of its maximum torque thereby reducing the wind force which is actually available to increase its rotational speed. As a consequence, the rotor has a built-in safety provision for excessive winds; so that it is not destroyed or damaged by high winds.

Figure 6:
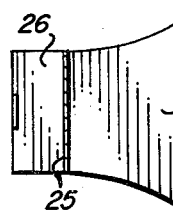
FIG. 6 illustrates a variation in the sheet metal configuration which may be used in place of the shape shown in FIG. 3.
Figure 5:
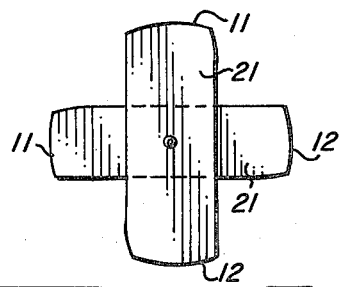
FIG. 5 is a top view of the assembly of FIG. 4.
Figure 7:
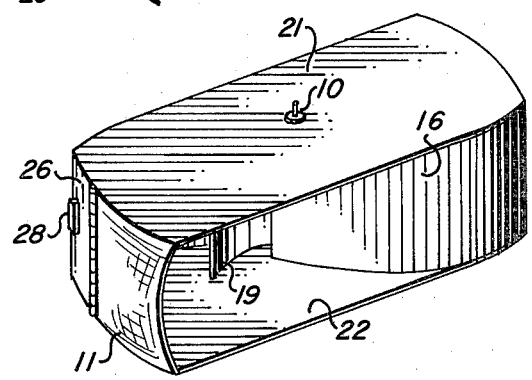
FIG. 7 shows a rotor assembly of the type illustrated in FIG. 2 but using a side rotor plate member of the type illustrated in FIG. 6.

FIGS. 6 and 7 illustrate another variation of the rotor assembly which may be used for the leading edges of the curved side rotor plate members 11 and 12. By cutting these members from sheet stock in the general shape shown in FIG. 6, and then assembling these members between a parallel pair of upper and lower plates 21 and 22, a compound curve is formed on the leading edges of the plates 11 and 12 to cause them to bow outwardly at the opening inlet. This causes even more air to enter into the rotor assembly than does when the configuration of FIG. 2 is used. Additional torque is provided as a result.

In the operation of the rotor with the inner rotor blade 19, it can be seen (most clearly in FIG. 1) that the air entering the opening of the rotor assembly enters a relatively wide channel between the tips of the S-curved inner rotor blade 19 and the inside edges of the outer curved side rotor plates 11 and 12 and then passes into a substantially narrower channel formed between the inner ends of the members 15 and 16 and the rotor blade 19. The air then exits at an increased velocity and strikes the convex portion of the inner rotor blade 19 along with air entering the rotor from outside. This is believed to be the reason that the composite assembly, which includes the inner blade 19, produces increased torque and improved low speed operating characteristics.

Other variations of rotor blade assemblies such as in the radii of curvature of the different curved parts, height, utilization of different types of materials, and the like will occur to those skilled in the art without departing from the scope of the invention. The foregoing description, directed to particular embodiments, is to be considered only as illustrative of the invention and is not to be considered as limiting the inventive concepts which are disclosed in the preferred embodiments.

We claim:

1. A rotor assembly including in combination:
   a rotatable shaft;
   first and second curved side rotor plate members each formed as a section of a cylinder having a radius R1, said plate members each being concentrically located a distance R1 from the axis of said shaft on diametrically opposite sides of said rotatable shaft, each of said first and second rotor plate members having first and second edges parallel to said shaft;
   third and fourth rotor plate members each formed as identical concave elongated sections and each attached respectively to the diametrically opposite first edges of said first and second rotor plate members at a distance R1 from the axis of said shaft to form discontinuities of curvature in the form of apexes along the lines of attachments thereof, said third and fourth rotor plate members curving toward said shaft and terminating in respective edges thereof parallel to said shaft, spaced less than the distance R1 from the axis of said shaft, and equidistant from a plane defined by the diametrically opposite second edges of said first and second side rotor plate members; and
   first and second end plate members attached to said first, second, third and fourth rotor plate members and located in spaced parallel planes perpendicular to the axis of said shaft to form end walls for said rotor assembly.

2. The combination according to claim 1 wherein said first and second plate members each are formed as sections comprising less than 90° of such cylinder of a radius R1.

3. The combination according to claim 1 wherein said first and second end plate members form end walls each having an area greater than the area defined by a projection of said first, second, third and fourth plate members thereon.

4. The combination according to claim 3 wherein said end plate members have a circumference which extends from the first edge of said first rotor plate member to the second edge of said second rotor plate member along the side of said second rotor plate member to the first edge thereof and from the first edge of said second rotor plate member to the second edge of said first plate member and along the curved side of said first rotor plate member to the first edge thereof.

5. The combination according to claim 1 further including an additional S-shaped rotor member having its center located at the axis of said shaft and radiating substantially opposing concave surfaces on opposite sides thereof and directed toward the respective openings between the second edges of said first and second side rotor plate members and the termination edges of said third and fourth rotor plate members.

6. The combination according to claim 5 wherein said third and fourth rotor plate members are each formed as sections of a cylinder having a radius R1 and terminate equidistantly on opposite sides of the axis of said shaft at a distance R3 from such axis, where R3 is less than R1.

7. The combination according to claim 6 wherein R1 equals 4R3 and the radius of curvature of each half of said S-shaped rotor member is approximately equal to R3.

8. The combination according to claim 6 wherein S-shaped auxiliary rotor blade extends into the opening formed by the second edge of each of said first and second side rotor plate members and the termination edge of said third and fourth rotor plate members, respectively.

9. The combination according to claim 1 further including centrifugally operated spoiler means for limiting the rotational speed of said rotor blade assembly.

10. The combination according to claim 9 wherein said first and second side rotor plate members are formed as a compound curve at the second edge, thereof bulging outwardly from the axis of said shaft from the first and second end plate members attached to said rotor plate members.

11. The combination according to claim 1 wherein said third and fourth rotor plate members are each formed as sections of a cylinder having a radius R1 and terminate equidistantly on opposite sides of the axis of said shaft at a distance R3 from such axis, where R3 is less than R1.

12. The combination according to claim 11 wherein R1 equals 4 R3.